Patented May 6, 1947

2,419,934

UNITED STATES PATENT OFFICE 2,419,934

OPTICALLY ACTIVE TETRAHYDRODIBENZOPYRANS HAVING MARIHUANA ACTIVITY AND PROCESS FOR MAKING SAME

Roger Adams, Urbana, Ill.

No Drawing. Application July 9, 1941,
Serial No. 401,655

14 Claims. (Cl. 260—333)

The present invention is directed to compounds having marihuana activity and the process of preparing the same, and is related to subject matters disclosed in my co-pending applications Serial Nos. 352,931 and 358,306 filed on August 16 and September 25, 1940, respectively. More specifically the present invention relates to a new process for preparing new optically active isomeric hydrocannabinols and derivatives thereof.

The basic reaction of the present invention in which pulegone is condensed with a 1,3-dihydroxy-5-alkyl (R) benzene may be illustrated as follows:

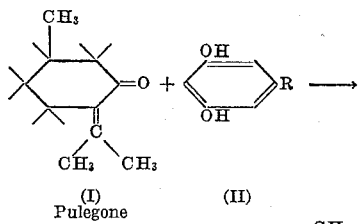

(I) Pulegone    (II)

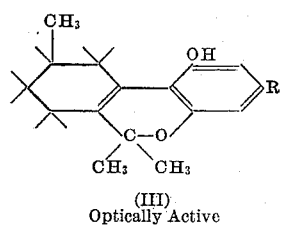

(III) Optically Active

In the above formula R stands for an alkyl group containing 1 to 11 carbon atoms and is further limited to alkyl groups in which the carbon atom attached to the ring at the 5-position is a —$CH_2$— or methylene group. Thus formula (II) above may be represented by the following formula:

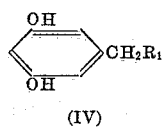

(IV)

where $R_1$ represents hydrogen or an alkyl group having 1 to 10 carbon atoms.

Examples of R alkyl groups coming within the scope of the present invention are: methyl, ethyl, propyl, butyl, n-amyl, iso-amyl, hexyl, heptyl, 4-methyl-hexyl, 3-ethyl-amyl, octyl, nonyl, etc. An example of an $R_1$ group is decyl in which case R has 11 carbon atoms.

The 1,3-dihydroxy-5-alkylbenzenes (II) intermediates for use in the present invention may be prepared by the general process of Suter and Weston, J. Am. Chem. Soc., 61, 232 (1939). The following method is illustrative: 1,3-dimethoxy-5-octophenone is converted by the Wolff-Kishner reduction to 1,3-dimethoxy-5-n-octylbenzene. The resulting colorless oil (B. P. 164°–168° C., 4 mm.) is subjected to demethylation and the final product (1,3-dihydroxy-5-n-octylbenzene) is obtained after recrystallization as colorless crystals with a melting point of 61°–62° C.

The following examples will serve to illustrate the present invention.

Example I

About 3.1 grams of pulegone (I) ($\alpha^{32}_D$ +24.3°), 2.5 grams of 1,3 dihydroxy-5-methyl-benzene (orcinol), 0.98 gram of phosphorus oxychloride (0.33 mole proportion) and 20 c.c. of dry benzene are first mixed together and then refluxed for about four hours. The reaction mixture is then poured into an excess of aqueous sodium bicarbonate and warmed on a steam bath until the phosphorus derivatives are decomposed. After cooling the benzene layer is separated and the aqueous layer extracted with a mixture of benzene and ether. The organic solvent solutions containing the desired product are then combined, extracted with 2 per cent aqueous sodium hydroxide and the solvent removed in the usual manner. The residue is then vacuum distilled at about 5 mm. (bath 202°–215° C.) at about 170°–180° C. The final product obtained is optically active, the specific rotations in ethanol varying from about $[\alpha]^{31}_D$ +83.5 to +90.4° depending on the boiling point of the specific fraction tested.

(a) Similar to the above preparation except for the use of an 0.47 mole proportion of $POCl_3$, fractions were obtained having rotations in ethanol of about $[\alpha]^{31}_D$ +78.1° to +84.8°.

(b) Similar to the above preparation except for the use of an 0.99 mole proportion of $POCl_3$, fractions were obtained having rotations in ethanol of about $[\alpha]^{31}_D$ +66.0° to +76.9°.

Example II

About 5 grams of pulegone, 6 grams of 1,3-dihydroxy-5-n-amylbenzene (olivetol), and 1.5 grams of phosphorus oxychloride (0.3 mole proportion) are refluxed in benzene solution for about four hours. The reaction product is then worked up, i. e. treated with sodium bicarbonate solution etc., as set forth in Example I and vacuum distilled at about 2 mm. (bath 225°–233° C.) at 190°–200° C. The final product obtained is an optically active tetrahydrocannabinol and is an isomer of the products described in the above mentioned co-pending applications. The specific rotations in ethanol and indices of refraction of the product obtained using the 0.3 mole proportion of $POCl_3$ set forth above vary as follows: fraction (1) boiling point 190°–195° C., $\alpha^{32}_D +72.0°$, $n^{20}_D 1.5509$; fraction (2) boiling point 195°–197° C., $+77.0°$, $n^{20}_D 1.5519$; fraction (3) boiling point 197°–200° C., $+73.0°$, $n^{20}_D 1.5529$.

(c) Similar to the above preparation except for the use of an 0.53 mole proportion of $POCl_3$, fractions were obtained having rotations of about $\alpha^{25}_D +70.0°$ to $+70.4°$.

(d) Similar to the above preparation except for the use of an 0.76 mole proportion of $POCl_3$ and with six hours of refluxing, fractions were obtained having rotations of about $\alpha^{25}_D +48.1°$ to $+53.1°$.

The reactions of Example II may be illustrated as follows:

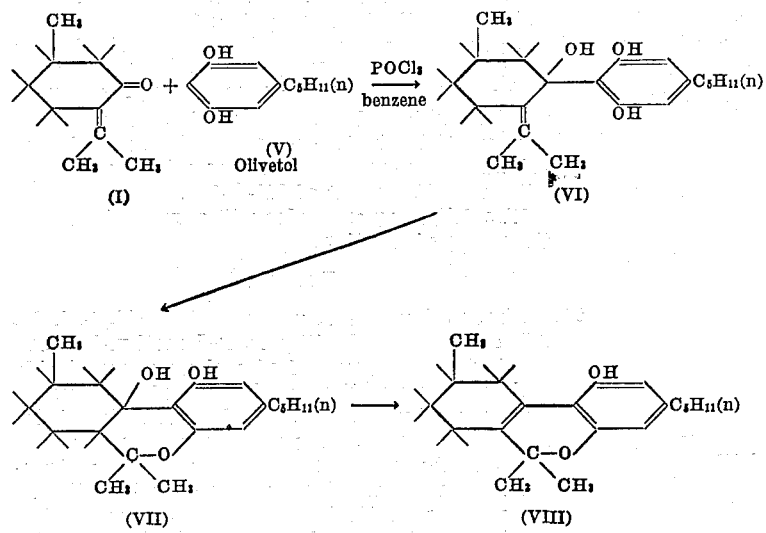

The structures of intermediates VI and VII have not been determined, but my investigations indicate that the reaction proceeds as illustrated. The final product VIII, however, analyzes for a tetrahydrocannabinol and appears to be a stereoisomer of the tetrahydrocannabinol described in my co-pending application Serial No. 358,306.

Other representative examples are as follows:

Example III

By condensing pulegone with 1,3-dihydroxy-5-n-butylbenzene in accordance with the general processes described above a 1-hydroxy-3-n-butyl-6,6,9-trimethyl-7,8,9,10-tetrahydro-6-dibenzopyran may be obtained boiling at about 145°–150° C. at 0.08 mm. In ethanol four fractions had the following rotations: $[\alpha]^{32}_D +72°$, $+75.5°$, $+80°$, $+71°$.

Example IV

By condensing pulegone with 1,3-dihydroxy-5-n-hexylbenzene in accordance with the above examples a 1-hydroxy-3-n-hexyl-6,6,9-trimethyl-7,8,9,10-tetrahydro-6-dibenzopyran may be obtained boiling at about 183°–186° C. at 0.4 mm. (bath 217–226° C.). Three fractions had the following average rotation in ethanol, $[\alpha]^{32}_D +75.9°$.

Similarly to the above examples, the isoamyl and various heptyl and octyl derivatives may be prepared by condensing pulegone with the proper 1,3-dihydroxy-3-alkyl benzene.

In sub-examples (a) and (b) of Example I and (c) and (d) of Example II it will be noted that an increase in the amount of condensing agent and/or time of refluxing materially reduces optical activity. This indicates that a change takes place in the molecule during or subsequent to initial condensation when excess reagent is present. In the present invention one may employ any of the ordinary acid condensing reagents, the optimum conditions varying with the optical activity desired.

The 1-hydroxy-3-alkyl-6,6,9-trimethyl-7,8,9,10-tetrahydro-6-dibenzopyrans of the present invention form the monoacyl derivatives and monoalkyl ethers in the same manner as the previously described pyran derivatives. Also upon reduction with one mole equivalent of hydrogen the double bond in the left-hand ring is eliminated and a hexahydro product is produced characterized by marihuana activity.

The benzene and tetrahydro rings in the above formula are shown in conventional manner. It will be understood in this connection that tetrahydro Formula A corresponds to Formula B as illustrated below:

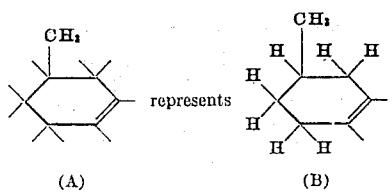

The products of the present invention have utility in the therapeutic field as, for example, in the treatment of "dope" addicts and alcoholics. A specific use is to eliminate or ameliorate the withdrawal symptoms experienced in the treatment of opiate derivative addictions.

It will be obvious that the present invention directed broadly to a new process and the resulting products is not limited to the above theoretical explanations of the reaction procedure or suggested formulae. All modifications of the present invention are intended to be covered by the following claims.

I claim:

1. In the process of preparing an optically active dibenzopyran derivative possessing marihuana activity the step which consists in condensing pulegone with a 1,3-dihydroxy-5-R₁CH₂-benzene by refluxing the same in a benzene reaction medium in the presence of phosphorus oxychloride, R₁ being selected from the group consisting of hydrogen and alkyl groups having 1 to 10 carbon atoms.

2. The process represented by the following reaction:

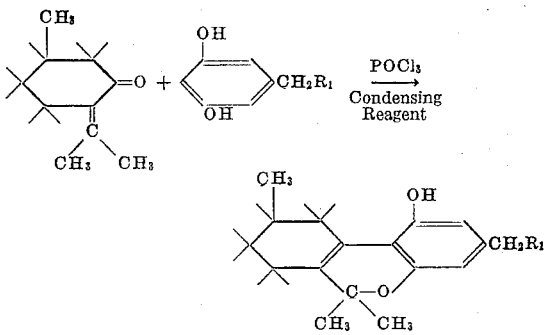

where R₁ is selected from the group consisting of hydrogen and alkyl groups having 1 to 10 carbon atoms and in which the two reactants on the left side of the arrow are condensed in the presence of POCl₃ to yield the product of the formula on the right of the arrow.

3. Optically active tetrahydro-dibenzopyran compounds possessing marihuana activity represented by the following formula:

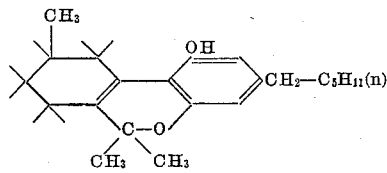

said compounds being further characterized as identical with condensation products of optically active naturally occurring pulegone and 1,3-dihydroxy-5-n-hexylbenzene.

4. Optically active tetrahydro-dibenzopyran compounds possessing marihuana activity represented by the following formula:

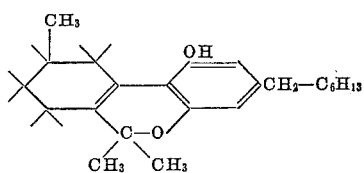

said compounds being further characterized as identical with condensation products of optically active naturally occurring pulegone and 1,3-dihydroxy-5-heptylbenzene.

5. Optically active tetrahydro-dibenzopyran compounds possessing marihuana activity represented by the following formula

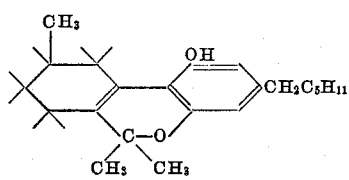

said compounds being further characterized as identical with condensation products of optically active naturally occurring pulegone and 1,3-dihydroxy-5-hexylbenzene.

6. Optically active tetrahydro-dibenzopyran compounds possessing marihuana activity represented by the following formula:

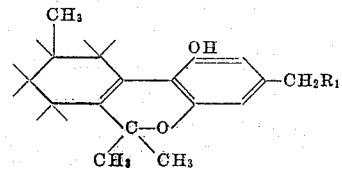

said compounds being further characterized as identical with condensation products of optically active naturally occurring pulegone and 1,3-dihydroxy-5-R₁CH₂ benzene, where R₁ is selected from the group consisting of hydrogen and alkyl groups having 1 to 10 carbon atoms; said compounds being devoid of cannabidiol and traces of other ingredients of crude cannabinol.

7. Optically active tetrahydro-dibenzopyran compounds possessing marihuana activity represented by the following formula:

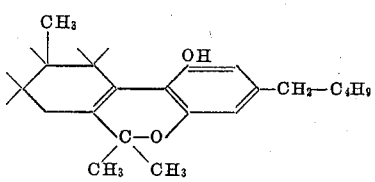

said compounds being further characterized as identical with condensation products of optically active naturally occurring pulegone and 1,3-dihydroxy-5-amylbenzene; said compounds being devoid of cannabidiol and traces of other ingredients of crude cannabinol.

8. Optically active tetrahydro-dibenzopyran compounds possessing marihuana activity represented by the following formula:

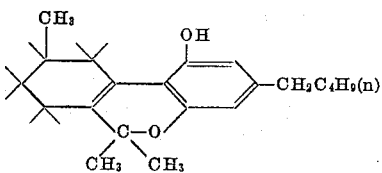

said compounds being further characterized as identical with condensation products of optically active naturally occurring pulegone and 1,3-dihydroxy-5-n-amylbenzene; said compounds being devoid of cannabidiol and traces of other ingredients of crude cannabinol.

9. A process for making a polyhydro dibenzo pyran which comprises condensing a 5-alkyl resorcinol with pulegone.

10. A process for making a polyhydro dibenzo pyran which comprises condensing olivetol with pulegone.

11. A process for making a polyhydro dibenzo pyran which comprises condensing 5-amyl resorcinol with pulegone.

12. A process for making a polyhydro dibenzo pyran which comprises condensing 5-n-hexyl resorcinol with pulegone.

13. A process for making a polyhydro dibenzo pyran which comprises condensing 5-hexyl resorcinol with pulegone.

14. A process for making a polyhydro dibenzo pyran which comprises condensing 5-heptyl resorcinol with pulegone.

ROGER ADAMS.

REFERENCES CITED

The following references are of record in the file of this patent:

FOREIGN PATENTS

| Number | Country | Date |
|---|---|---|
| 285,829 | German | July 12, 1915 |

OTHER REFERENCES

1. Frankel Archiv für Experimentelle Patholigie und Pharmacologie, vol. 49, pages 272–284 (1902–1903).
2. J. American Chem. Soc., vol. 66, pages 26–29 (1942).
3. Dispensatory of U. S. of America, Wood-LaWall, 21st edition; pages 277–281.
4. J. Chemical Society (London), 1940, pages 1118–1125.
5. J. Chemical Society (London), 1941, pages 137–140.
6. J. Washington Academy of Sciences, vol. 28, pages 465–476 (1938).
7. J. American Chemical Society, vol. 62, pages 2401–08 (March 1940).
8. Science, vol. 91, pages 602–3 (1933).